(12) United States Patent
Takahata et al.

(10) Patent No.: US 6,552,461 B2
(45) Date of Patent: Apr. 22, 2003

(54) PERMANENT MAGNET TYPE ROTATING ELECTRIC MACHINE

(75) Inventors: Ryoichi Takahata, Hitachi (JP); Shinichi Wakui, Hitachi (JP); Haruo Koharagi, Juo (JP); Satoshi Kikuchi, Hitachi (JP); Miyoshi Takahashi, Hitachi (JP); Masaharu Senoh, Narashino (JP); Keiji Noma, Shisui (JP); Hiroshi Hirayama, Oyama (JP); Takashi Seshimo, Ohira (JP); Shigeya Kawaminami, Ohira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/091,336

(22) Filed: Mar. 6, 2002

(65) Prior Publication Data

US 2002/0130574 A1 Sep. 19, 2002

(30) Foreign Application Priority Data

Mar. 9, 2001 (JP) ........................................ 2001-065915

(51) Int. Cl.⁷ ........................... H02K 1/129; H02K 1/24; F04B 17/00
(52) U.S. Cl. ............. 310/156.53; 310/156; 310/156.56; 310/218; 310/216; 310/180; 310/254
(58) Field of Search .............................. 310/156.53, 216, 310/218, 254, 197, 180, 258

(56) References Cited

U.S. PATENT DOCUMENTS

| 4,741,677 A | * | 5/1988 | Frigo ........................... 417/366 |
| 5,838,086 A | * | 11/1998 | Cuenot ......................... 310/156 |
| 6,353,275 B1 | * | 3/2002 | Nishiayma ................. 310/156.53 |

FOREIGN PATENT DOCUMENTS

JP            06-339241           6/1994

* cited by examiner

Primary Examiner—Nestor Ramirez
Assistant Examiner—Iraj A Mohandesi
(74) Attorney, Agent, or Firm—Crowell & Moring LLP

(57) ABSTRACT

In a permanent magnet type rotating electric machine comprising a stator of which concentratedly wound armature windings are disposed in a plurality of slots formed in a stator core so as to surround teeth and a rotor accommodating permanent magnets in a plurality of permanent magnet insertion holes formed in a rotor core, a part of outer circumferential faces of slots is formed to extend substantially in parallel with a part of inner circumferential faces of the teeth, thereby, a permanent magnet type rotating electric machine with limited noises can be realized.

8 Claims, 4 Drawing Sheets

| B / A x 100 % | 50 | 55 | 60 | 65 | 70 | 75 | 80 |
|---|---|---|---|---|---|---|---|
| 6 th DEGREE NOISE | ○ | ○ | ○ | ○ | ○ | × | × |
| MOTOR EFFICIENCY | × | ○ | ○ | ○ | ○ | ○ | ○ |

PERMANENT MAGNET TYPE ROTATING ELECTRIC MACHINE

BACKGROUND OF THE INVENTION

1. Field of the Invention

The present invention relates to a permanent magnet type rotating electric machine with a field use permanent magnet rotor and, in particular, relates to a permanent magnet type rotating electric machine mounted for such as a compressor in an air conditioner.

2. Conventional Art

Conventionally, permanent magnets having a variety of configurations were used for this sort of permanent magnet type rotating electric machine. For example, JP-A-6-339241 (1994) discloses a permanent magnet type rotating electric machine which includes a stator to which concentratedly wound armature windings are applied so as to surround a plurality of teeth formed in a stator core and a rotor accommodating permanent magnets in a plurality of permanent magnet insertion holes formed in a rotor core and of which output is improved by making use of its reluctance toque.

The above conventional art intends to improve output torque of the rotating electric machine, however, when reducing into an actual practice of such rotating electric machine, a problem of noises of such rotating electric machine can not be forgotten. Namely, since the concentrated windings increase ripple torques in comparison with conventional distributed windings and which frequently causes problem of noises.

SUMMARY OF THE INVENTION

An object of the present invention is to provide a permanent magnet type rotating electric machine which resolves the noise problem even if concentrated windings are used therefor.

In order to achieve the above object, one aspect of the present invention proposes a permanent magnet type rotating electric machine comprising a stator of which concentratedly wound armature windings are disposed in a plurality of slots formed in a stator core so as to surround teeth and a rotor accommodating permanent magnets in a plurality of permanent magnet insertion holes formed in a rotor core, wherein a part of outer circumferential faces of slots is formed to extend in parallel with a part of inner circumferential faces of the teeth.

Further, another aspect of the present invention proposes a permanent magnet type rotating electric machine comprising a stator of which concentratedly wound armature windings are disposed in a plurality of slots formed in a stator core so as to surround teeth and a rotor in which around a rotor core permanent magnets are disposed and around the outer circumference thereof, a non-iron metal is covered, wherein a part of outer circumferential faces of slots is formed to extend in parallel with a part of inner circumferential faces of the teeth.

Effective countermeasures for reducing the noises of a permanent magnet type rotating electric machine are either to reduce electromagnetic excitation force of the noise origin cause or to remove a resonating structural body caused thereby.

The present invention proposes structures result from a variety of studies performed in view of removing the resonating structural body.

Namely, through provision of a part of outer circumferential faces of slots in a stator core extending in parallel with a part of inner circumferential faces of teeth thereof, oscillation of magnetic pole pieces of the teeth is prevented, thereby, a permanent magnet type rotating electric machine with reduced vibration and noises can be provided.

DETAILED DESCRIPTION OF THE PREFERRED EMBODIMENTS

Now, embodiments of the permanent magnet type rotating electric machine according to the present invention will be explained with reference to FIGS. 1 through 8.

(Embodiment 1)

Figure 1:
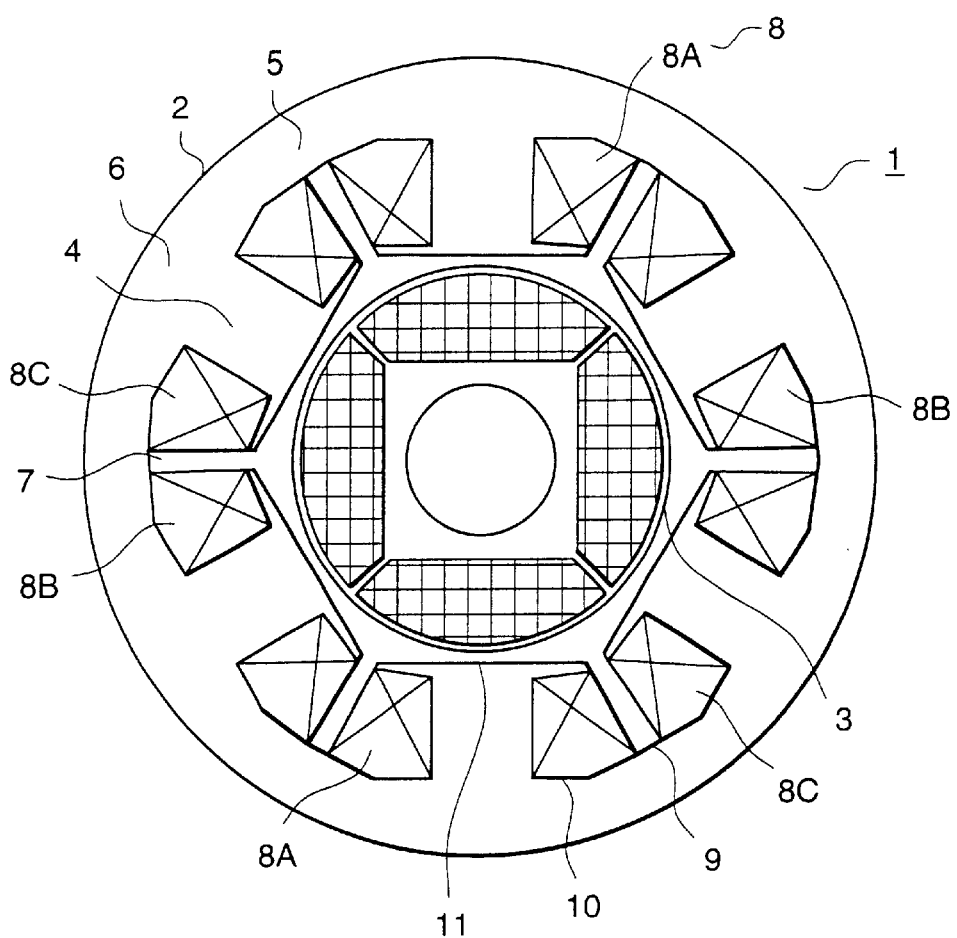
FIG. 1 is a diagram showing a cross sectional configuration in radial direct of a first embodiment of a permanent magnet type rotating electric machine according to the present invention.
Figure 2:
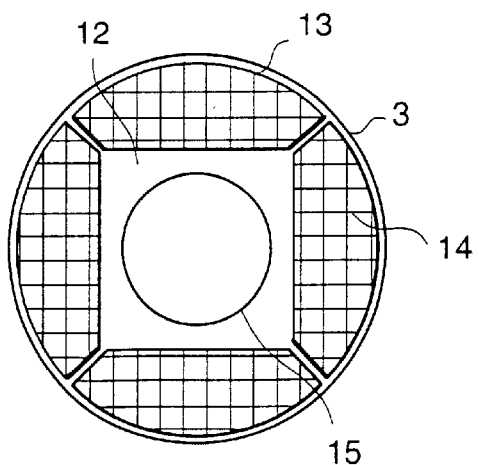
FIG. 2 is a diagram showing a cross sectional configuration in radial direction of a rotor in the first embodiment according to the present invention.

FIG. 1 shows a cross sectional configuration in radial direction of a first embodiment of the permanent magnet type rotating electric machine according to the present invention. In the drawing, a permanent magnet type rotating electric machine 1 is constituted by a stator 2 and a rotor 3. The stator 2 includes a stator core 6 having teeth 4 and a core back 5 and concentratedly wound armature windings (which are constituted by U phase windings 8A, V phase windings 8B and W phase windings 8C of three phases windings) 8 which are disposed in respective slots 7 between teeth 4 and are wound around the respective teeth 4 so as to surround the same. Numeral 9 is a slot outer circumferential face in an arcuate shape and in a part of the slot outer circumferential face 9 includes a parallel portion (a slot outer circumferential face straight line portion) 10 which is in parallel with a straight line portion 11 of teeth inner circumferential faces. FIG. 2 shows a cross sectional configuration of the rotor 3 of the embodiment 1 according to the present invention. The rotor 3 includes permanent magnets 14 which are accommodated in permanent magnet insertion holes 13 formed in a rotor core 12 and a shaft hole 15 into which a shaft (not shown) is fittedly received.

Now, in a compressor use permanent magnet type rotating electric machine 1 which is an object of the present invention, vibration and noise thereof are frequently a problem to be solved. In particular, since the concentratedly wound armature windings 8 are 120° windings (since a conventional distributedly wound armature windings are 180° windings, a higher harmonic magnetomotive force is limited), a large amount of higher harmonic magnetomotive force components is contained, thereby, a higher harmonic electro-magnetic exciting force is induced which causes the vibration and noises. When employing the concentratedly wound armature windings, it is necessary to check problems with regard to vibration and noises.

Figures 3, 4:
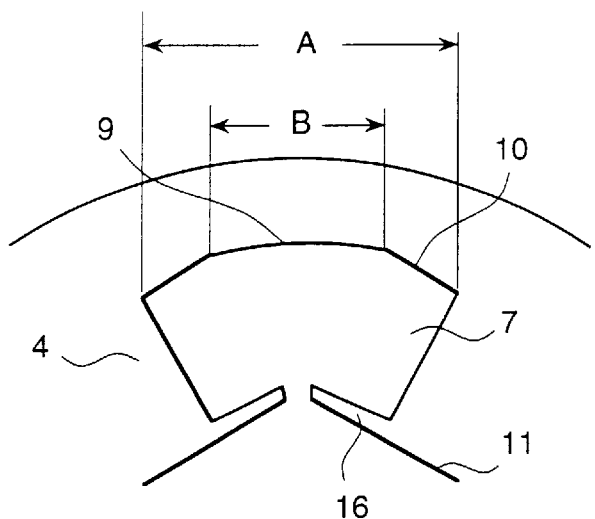
FIG. 3 is cross sectional view of a slot configuration of a stator according to the present invention.
FIG. 4 is a diagram showing noise comparison of the first embodiment according to the present invention.

FIG. 3 is a cross sectional view showing a stator slot configuration of the present invention. In the drawing, the straight line portion 11 on the inner circumferential face of the teeth 4 extends upto a magnetic pole piece 16, and after structuring a part of outer circumferential face 9 of the slot 7 to include parallel portions (slot outer circumferential face straight line portions) 10 which are in parallel with the straight line portion 11 of the inner circumferential face of the teeth 4, noise test was performed while varying ratio B/A wherein A represents width including outer circumferential face 9 and the straight portions 10 of the slot 7 and B represents width of the outer circumferential face 9 of the slots 7.

FIG. 4 shows a noise comparison of the embodiment 1 of the present invention. When varying the ratio B/A by unit of 5% as shown in the drawing, noise of 6th degree increases after exceeding the ratio B/A over 75%, therefore which is judged unacceptable as indicated X, on the other hand, the noise decreases, when lowering the ratio below B/A=70% therefore, which is judged acceptable as indicated O. Accordingly, in connection with only noise reduction it is sufficient if the ratio B/A is set below 70%. However, in these days competition with regard to energy saving of the compressor use permanent magnet type rotating electric machine is very keen, and an efficiency of motor is one of important problems. When observing the motor efficiency in connection with the ratio B/A, when ratio B/A is set below 50%, accommodating area of the armature windings in each of the slots 7 is limited which necessitates to use coils formed by a wire of fine diameter and which increases winding resistance to reduce motor efficiency, therefore, the ratio B/A=50% is judged unacceptable as indicated X, however, the ratio B/A is set more than 50% an effective accommodating area of the armature windings is ensured and the winding resistance is reduced to increase the motor efficiency, therefore, the ratio B/A=55% is judged acceptable as indicated O.

Accordingly, in order to fulfill both requirements with regard to noises and motor efficiency, it is desirable to set the ratio B/A in a range 55% through 70%.

(Embodiment 2)

Figure 5:
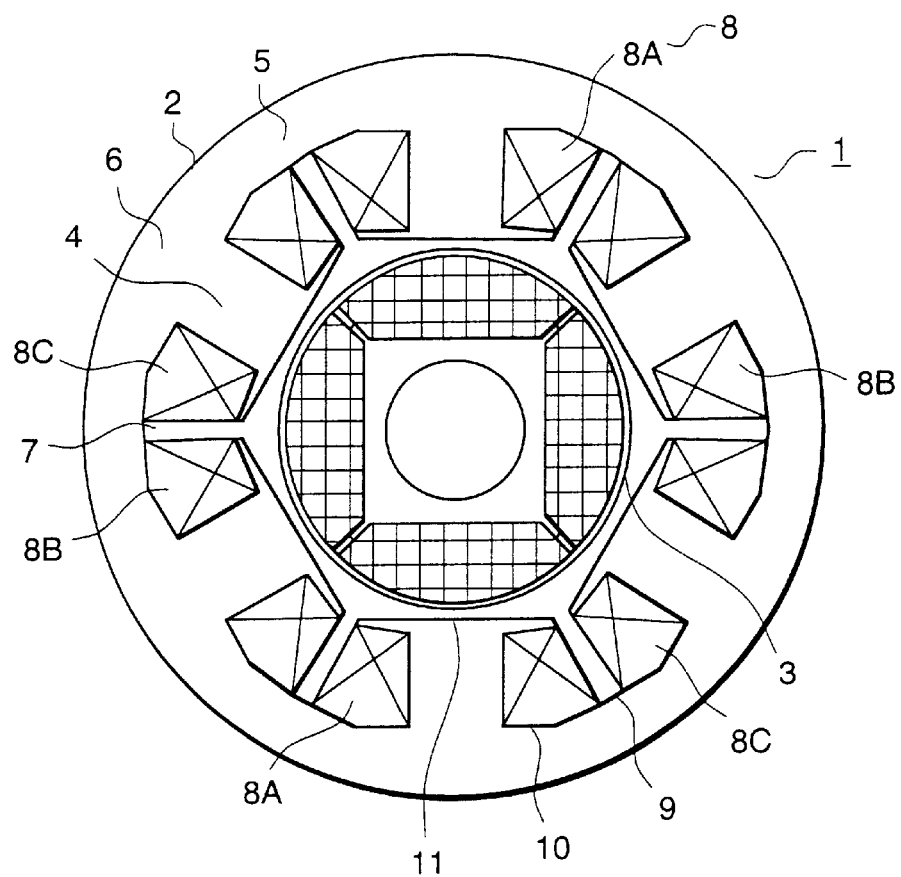
FIG. 5 is a diagram showing a cross sectional configuration in radial direct of a second embodiment of a permanent magnet type rotating electric machine according to the present invention.
Figure 6:
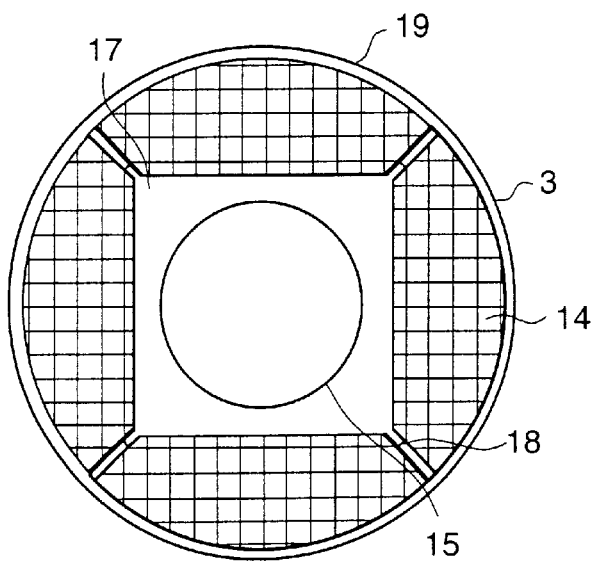
FIG. 6 is a diagram showing a cross sectional configuration in radial direction of a rotor in the second embodiment according to the present invention.

FIG. 5 is a cross sectional configuration in radial direction of the embodiment 2 of the permanent magnet type rotating electric machine according to the present invention, and FIG. 6 is a cross sectional configuration in radial direction of the rotor in the embodiment 2 according to the present invention. In the drawing, to the same or equivalent elements as shown in FIGS. 1 and 2 the same reference numerals are assigned, thereby, their explanation is omitted. A different point from FIG. 2 embodiment from the present embodiment is that the rotor core 17 includes projecting portions 18, the permanent magnets 14 are disposed around the outer circumferential side of the rotor core 17 and the outer circumferential faces of the permanent magnets 14 are covered by a protective cover 19 of non-magnetic and non-iron metallic material. The vibration and noise can sometimes be countermeasured by modifying the stator configuration as in the embodiment 1, however, it sometimes required to reduce the electromagnetic exciting force itself. If the protective cover 19 itself is, for example, made of stainless steel, eddy currents flow within the stainless steel so as to cancel out the magnetic flux induced by the higher harmonic current components, thereby, the vibration and noises can be reduced.

(Embodiment 3)

Figure 7:
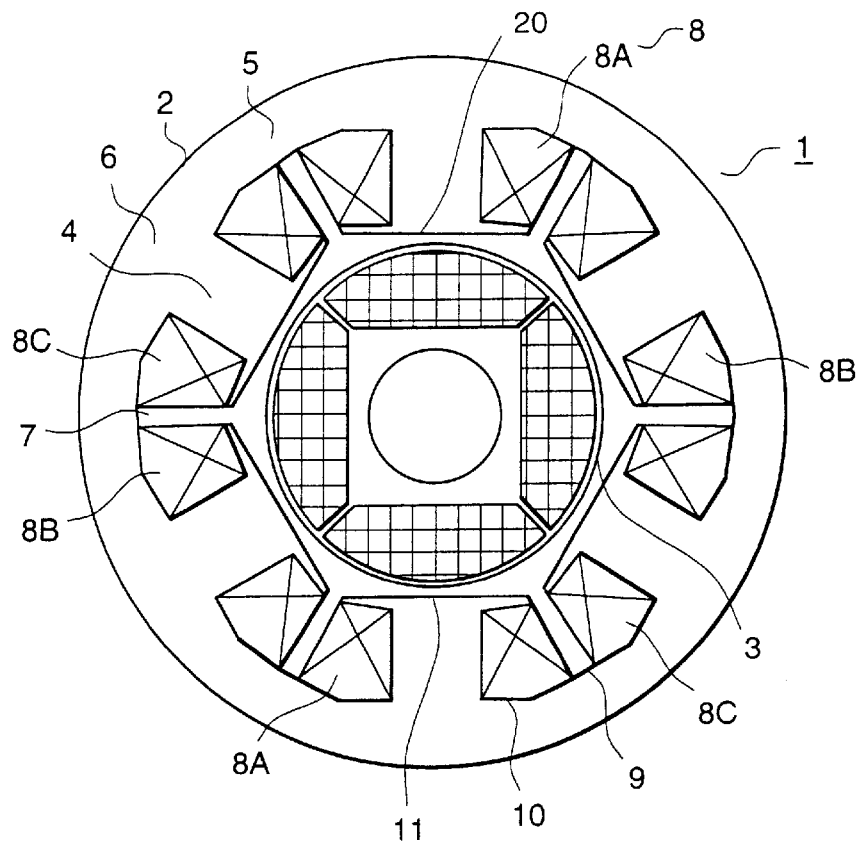
FIG. 7 is a diagram showing a cross sectional configuration in radial direction of a third embodiment of a permanent magnet type rotating electric machine according to the present invention.

FIG. 7 is a cross sectional configuration in radial direction of the embodiment 3 of the permanent magnet type rotating electric machine according to the present invention. In the drawing, to the same or equivalent elements as shown in FIG. 1 the same reference numerals are assigned, thereby, their explanation is omitted. A different point of the present embodiment from FIG. 1 embodiment is that at a part of the straight line portion along the inner circumferential side of the teeth 4 in the stator core 6 an arcuate shaped portion 20 is provided, and with the present embodiment substantially the same advantages of embodiment 1 can be obtained with regard to the fundamental performance.

(Embodiment 4)

Figure 8:
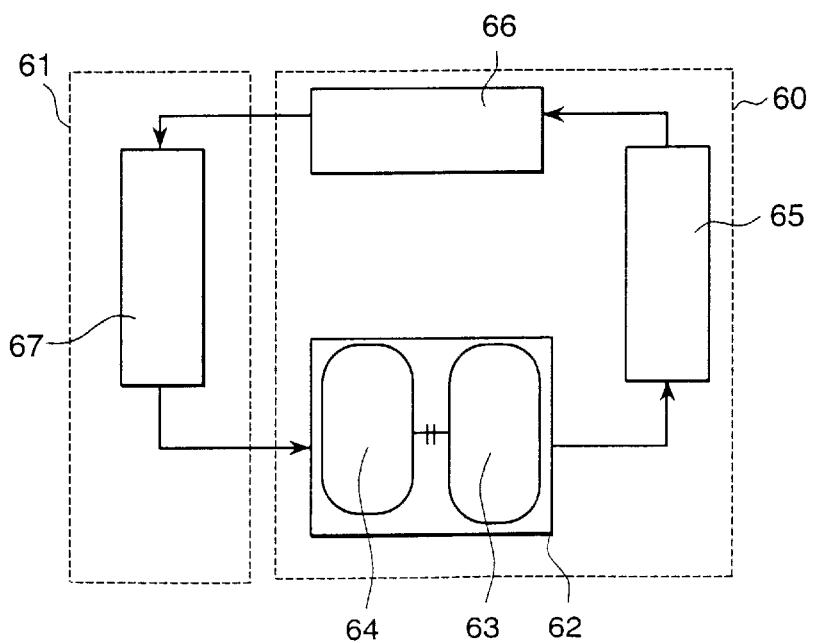
FIG. 8 is a diagram showing a refrigerating cycle of an air conditioner relating to the present invention.

FIG. 8 is a diagram showing a refrigerating cycle of an air conditioner relating to the present invention. 60 is an outdoor machine, 61 is an indoor machine, 62 is a compressor, within the compressor 62 a permanent magnet type rotating electrical machine 63 and a compressing unit 64 are enclosed. 65 is a condenser, 66 is an expansion valve and 67 is an evaporator. The refrigerating cycle causes to circulate cooling medium in the arrowed direction, the compressor compresses the cooling medium and heat exchanging is performed between the outdoor machine 60 including the expansion valve and the indoor machine 67 including the evaporator 67 to effect a cooling function. When the permanent magnet type rotating electrical machine 1 according to the present invention is used for the permanent magnet type rotating electric machine 63, the output of the permanent magnet type rotating machine 63 can be increased as well as the vibration and noises thereof can be reduced. Accordingly, a compressor and an air conditioner taking into account of environment problems can be provided.

According to the present invention, a permanent magnet type rotating electric machine with limited vibration and noises can be obtained.

What is claimed is:

1. A permanent magnet type rotating electric machine comprising:

a stator having a plurality of slots formed in a stator core and separated by teeth in a circumferential direction;

concentratedly wound armature windings disposed in said slots and surrounding said teeth; and a rotor accommodating permanent magnets in a plurality of permanent magnet insertion holes formed in a rotor core; wherein an inner face of each of said teeth has a substantially planar surface facing said rotor; and an outer periphery of each said slot comprises first and second portions which are substantially planar and are substantially parallel, respectively, to inward facing planar surfaces of teeth adjacent said slot, and a substantially non-parallel portion.

2. A permanent magnet type rotating electric machine comprising:

a stator having a plurality of slots formed in a stator core so as to surround teeth in a circumferential direction;

concentratedly wound armature windings disposed in said slots and surround said teeth; and a rotor in which around a rotor core permanent magnets are disposed and around the outer circumference thereof, a non-iron metal cover is provided; wherein an inner face of each of said teeth has a substantially planar surface facing said rotor; and an outer periphery of each said slot comprises first and second portions which are substantially planar and are substantially parallel, respectively, to inward facing planar surfaces of teeth adjacent said slot, and a substantially non-parallel portion.

3. A permanent magnet type rotating electric machine according to claim 1, wherein a ratio of non-parallel portion width of the outer circumferential face of each of the slots with respect to an entire width including parallel and non-parallel portions thereof is set below 75%.

4. A permanent magnet type rotating electric machine according to claim 1, wherein a ratio of non-parallel portion width of the outer circumferential face of each of the slots with respect to an entire width including parallel and non-parallel portions thereof is set in a range 55% through 70%.

5. A permanent magnet type rotating electrical machine according to claim 1, wherein the inner circumferential face of each of the teeth is configured in substantially straight line shape.

6. A permanent magnet type rotating electrical machine according to claim 1, wherein a part of the inner circumferential face of each of the teeth is configured in an arcuate shape and the remaining part thereof is configured in non-arcuate shape.

7. A compressor which is constituted to be driven by a permanent magnet type rotating electric machine according to claim 1.

8. An air conditioner which is provided with a compressor according to claim 7.

* * * * *